United States Patent
Long et al.

(10) Patent No.: US 10,952,213 B2
(45) Date of Patent: Mar. 16, 2021

(54) FREQUENCY ALLOCATION METHOD, CONTROL DEVICE, AND SYSTEM IN MICROWAVE NETWORK

(71) Applicant: Huawei Technologies Co., Ltd., Shenzhen (CN)

(72) Inventors: Hao Long, Madrid (ES); Dejun Li, Chengdu (CN); Xiaodong Li, Chengdu (CN); Maurizio Mattivi, Milan (IT); Italo Busi, Segrate (IT)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 634 days.

(21) Appl. No.: 15/686,440

(22) Filed: Aug. 25, 2017

(65) Prior Publication Data
US 2017/0353958 A1     Dec. 7, 2017

Related U.S. Application Data

(63) Continuation of application No. PCT/CN2015/073418, filed on Feb. 28, 2015.

(51) Int. Cl.
| | |
|---|---|
| *H04W 72/04* | (2009.01) |
| *H04W 16/14* | (2009.01) |
| *H04W 24/02* | (2009.01) |
| *H04W 28/26* | (2009.01) |
| *H04W 72/08* | (2009.01) |

(52) U.S. Cl.
CPC ....... *H04W 72/0453* (2013.01); *H04W 16/14* (2013.01); *H04W 24/02* (2013.01); *H04W 28/26* (2013.01); *H04W 72/08* (2013.01)

(58) Field of Classification Search
CPC . H04W 72/08; H04W 28/26; H04W 72/0453; H04W 16/14; H04W 24/02
See application file for complete search history.

(56) References Cited

U.S. PATENT DOCUMENTS

| | | |
|---|---|---|
| 6,032,046 A | 2/2000 | Nakano |
| 7,142,523 B1 | 11/2006 | Chekuri et al. |
| (Continued) | | |

FOREIGN PATENT DOCUMENTS

| | | |
|---|---|---|
| CN | 1336772 A | 2/2002 |
| CN | 1413035 A | 4/2003 |
| (Continued) | | |

*Primary Examiner* — Charles C Jiang
*Assistant Examiner* — Voster Preval
(74) *Attorney, Agent, or Firm* — Slater Matsil, LLP

(57) ABSTRACT

A frequency allocation method includes receiving, by a control device, a frequency allocation message using a dedicated channel, wherein the frequency allocation message carries a node identifier and a received signal strength information for a frequency, and determining, according to the frequency allocation message, a station needing frequency allocation, and obtaining node information of each station in a network. The method further includes computing, according to the received signal strength information for the frequency of the station needing frequency allocation and further according to the node information of each station, an optimum working frequency of the station needing frequency allocation, and allocating the optimum working frequency to the station needing frequency allocation.

19 Claims, 6 Drawing Sheets

(56) References Cited

U.S. PATENT DOCUMENTS

| | | | |
|---|---|---|---|
| 2009/0163222 A1* | 6/2009 | Schaepperle | H04W 72/085 455/452.2 |
| 2009/0257380 A1* | 10/2009 | Meier | H04W 72/082 370/329 |
| 2010/0151894 A1 | 6/2010 | Oh et al. | |
| 2010/0157927 A1* | 6/2010 | Mochizuki | H04L 27/0006 370/329 |
| 2013/0188597 A1* | 7/2013 | Ikeda | H04W 36/18 370/331 |
| 2014/0328190 A1* | 11/2014 | Lord | H04W 24/08 370/252 |
| 2015/0110041 A1* | 4/2015 | Ren | H04W 72/048 370/329 |
| 2016/0157103 A1* | 6/2016 | Teng | H04W 16/14 370/329 |
| 2017/0111914 A1 | 4/2017 | Chen et al. | |
| 2017/0150506 A1* | 5/2017 | Mitsui | H04W 16/14 |

FOREIGN PATENT DOCUMENTS

| | | |
|---|---|---|
| CN | 101835176 A | 9/2010 |
| CN | 102883329 A | 1/2013 |
| CN | 103281699 A | 9/2013 |
| CN | 103813347 A | 5/2014 |
| CN | 103945403 A | 7/2014 |
| CN | 104053159 A | 9/2014 |
| CN | 104066149 A | 9/2014 |
| CN | 104333875 A | 2/2015 |
| EP | 2312880 A1 | 4/2011 |
| EP | 3113532 A1 | 1/2017 |
| WO | 2010053274 A2 | 5/2010 |
| WO | WO-2016074599 A1 * | 11/2015 ............ H04W 16/14 |
| WO | WO-2016074599 A1 * | 5/2016 ............ H04W 16/14 |

* cited by examiner

FREQUENCY ALLOCATION METHOD, CONTROL DEVICE, AND SYSTEM IN MICROWAVE NETWORK

CROSS-REFERENCE TO RELATED APPLICATIONS

This application is a continuation of International Application No. PCT/CN2015/073418, filed on Feb. 28, 2015, the disclosure of which is hereby incorporated by reference in its entirety.

TECHNICAL FIELD

The present application relates to the communications field, and in particular, to a frequency allocation method, a control device, and a system in a microwave network.

BACKGROUND

In a wireless communications network, a microwave frequency band is usually used as a bearer for signal backhaul between base stations. In a 4G wireless network, a distance between base stations is short, and a data access capacity may be increased by deploying small cells. Featuring many spectrum resources and high attenuation, a 60 GHz frequency band may become an important solution of signal backhaul between densely deployed 4G stations. However, a 600 GHz microwave system is prone to interference due to the following reasons. A free frequency band is uncontrolled in actual deployment; effects such as wall reflection and diffraction are caused when the microwave system is deployed in a block or on a roof; that the 60 GHz frequency band is also used for another service such as wireless HD, may cause interference to microwave transmission.

Because microwave links easily interfere with each other, when a station is deployed in a microwave network, an appropriate frequency needs to be found to obtain optimum link quality. In a common practice, frequency scanning software is integrated into a microwave device and performs frequency scanning onsite after installation, to select a frequency with small interference as a working frequency. Moreover, a frequency hopping function is integrated into the microwave device, and when it is detected that there is serious interference on a currently used frequency, another frequency is selected for frequency hopping. However, because in a case of densely deployed stations, frequency hopping is performed independently for a link, an appropriate frequency cannot be found. In addition, the microwave device needs to be manually installed on a station to perform frequency scanning or frequency hopping. This is time-consuming and has high labor costs.

SUMMARY

In view of this, embodiments of the present invention provide a frequency allocation method, a control device, and a system in a microwave network, so as to resolve problems of a conflict of frequency use and high labor costs during frequency allocation of a station in the microwave network.

According to a first aspect, an embodiment of the present invention provides a frequency allocation method, including receiving, by a control device, a frequency allocation message by using a dedicated channel, where the frequency allocation message carries a node identifier and received signal strength information on a frequency; determining, according to the frequency allocation message, a station to which a frequency needs to be allocated, and obtaining node information of each station in a network; and computing, according to the received signal strength information on the frequency of the station to which a frequency needs to be allocated and the node information of each station, an optimum working frequency of the station to which a frequency needs to be allocated, and allocating the optimum working frequency to the station to which a frequency needs to be allocated.

With reference to the first aspect, in a first possible implementation manner of the first aspect, the control device receives, by using the dedicated channel, the frequency allocation message of the station to which a frequency needs to be allocated, where the frequency allocation message is a frequency allocation request message; and the determining, according to the frequency allocation message, a station to which a frequency needs to be allocated specifically includes determining, by the control device according to a node identifier carried in the frequency allocation request message, that a station which sends the frequency allocation request message is the station to which a frequency needs to be allocated.

With reference to the first aspect or the first possible implementation manner of the first aspect, in a second possible implementation manner of the first aspect, the control device receives a frequency allocation message of each station by using the dedicated channel, where the frequency allocation message of each station carries a node identifier and received signal strength information on a frequency of each station, and the received signal strength information on the frequency of each station includes interference signal strength; and the determining, according to the frequency allocation message, a station to which a frequency needs to be allocated specifically includes, when the interference signal strength is greater than a preset threshold, determining, by the control device, that a station whose interference signal strength is greater than the preset threshold is the station to which a frequency needs to be allocated.

With reference to any one of the first aspect, or the first to the second possible implementation manners of the first aspect, in a third possible implementation manner of the first aspect, the node information of each station includes the node identifier, and the node identifier is used to identify the station.

With reference to any one of the first aspect, or the first to the third possible implementation manners of the first aspect, in a fourth possible implementation manner of the first aspect, the node information of each station further includes a node location, transmit power, receiver sensitivity, an antenna gain, and an antenna direction.

With reference to the first aspect, or the first to the fourth possible implementation manners of the first aspect, in a fifth possible implementation manner of the first aspect, the optimum working frequency includes an optimum transmit working frequency and an optimum receive working frequency, and the computing, according to the received signal strength information on the frequency of the station to which a frequency needs to be allocated and the node information of each station, an optimum working frequency of the station to which a frequency needs to be allocated specifically includes, when the station to which a frequency needs to be allocated is a node i, and a station directly connected to the station to which a frequency needs to be allocated is a node j, computing an optimum transmit working frequency of the node i, where the optimum transmit working frequency satisfies at least the following conditions: $P_{i \to j} > RS_j$ and $MIN\{RS_x/P_{i \to x}\} > CI_x$; and computing an optimum receive working frequency of the node i, where the optimum receive working frequency satisfies at least the following conditions: $P_{j \to i} > RS_i$ and $MIN\{RS_i/P_{y \to i}\} > CI_i$, where $P_{i \to j}$ represents received signal strength generated by the node i for the node j when the node i works at a transmit working frequency; $P_{j \to i}$ represents received signal strength generated by the node j for the node i when the node i works at a receive working frequency; $RS_x$ represents receiver sensitivity existing when a node x works in a state of maximum channel bandwidth and a highest modulation mode, $P_{i \to x}$ represents interference signal strength generated by the node i for the node x when the node i works at the transmit working frequency, $RS_x/P_{i \to x}$ represents a carrier-to-interference ratio of the node x, $CI_x$ represents a carrier-to-interference ratio threshold for the node x, the node x is any node or at least one node other than the node i and the node j, and a receive working frequency of the node x is a transmit working frequency selected by the node i or an adjacent frequency of a transmit working frequency selected by the node i; and $RS_i$ represents receiver sensitivity existing when the node i works in the state of the maximum channel bandwidth and the highest modulation mode, $P_{y \to i}$ represents interference signal strength generated by a node y for the node i when the node i works at the receive working frequency, $RS_i/P_{y \to i}$ represents a carrier-to-interference ratio of the node i, $CI_i$ represents a carrier-to-interference ratio threshold for the node i, the node y is any node or at least one node other than the node i and the node j, and a transmit working frequency of the node y is a receive working frequency selected by the node i or an adjacent frequency of a receive working frequency selected by the node i.

With reference to the first aspect, or the first to the fifth possible implementation manners of the first aspect, in a sixth possible implementation manner of the first aspect, after the control device allocates the optimum working frequency to the station to which a frequency needs to be allocated, the method further includes disconnecting, by the control device, the dedicated channel, and establishing, by using the optimum working frequency, a connection to the station to which a frequency needs to be allocated.

With reference to any one of the first aspect, or the first to the sixth possible implementation manners of the first aspect, in a seventh possible implementation manner of the first aspect, the dedicated channel includes any one of a virtual local area network VLAN connection, a label switched path LSP connection, or a physical link connection.

According to a second aspect, an embodiment of the present invention provides a control device in a microwave network, including a receiving module, configured to receive a frequency allocation message by using a dedicated channel, where the frequency allocation message carries a node identifier and received signal strength information on a frequency, a determining module, configured to determine, according to the frequency allocation message, a station to which a frequency needs to be allocated; an obtaining module, configured to obtain node information of each station in a network; a computation module, configured to compute, according to the received signal strength information on the frequency of the station to which a frequency needs to be allocated and the node information of each station, an optimum working frequency of the station to which a frequency needs to be allocated; and an allocation module, configured to allocate the optimum working frequency to the station to which a frequency needs to be allocated.

With reference to the second aspect, in a first possible implementation manner of the second aspect, the receiving module is configured to receive, by using the dedicated channel, the frequency allocation message of the station to which a frequency needs to be allocated, where the frequency allocation message is a frequency allocation request message; and the determining module is specifically configured to determine, according to a node identifier carried in the frequency allocation request message, that a station which sends the frequency allocation request message is the station to which a frequency needs to be allocated.

With reference to the second aspect or the first possible implementation manner of the second aspect, in a second possible implementation manner of the second aspect, the receiving module is configured to receive a frequency allocation message of each station by using the dedicated channel, where the frequency allocation message of each station carries a node identifier and received signal strength information on a frequency of each station, and the received signal strength information on the frequency of each station includes interference signal strength; and the determining module is specifically configured to, when the interference signal strength is greater than a preset threshold, determine that a station whose interference signal strength is greater than the preset threshold is the station to which a frequency needs to be allocated.

With reference to any one of the second aspect, or the first to the second possible implementation manners of the second aspect, in a third possible implementation manner of the second aspect, the node information of each station includes the node identifier, and the node identifier is used to identify the station.

With reference to any one of the second aspect, or the first to the third possible implementation manners of the second aspect, in a fourth possible implementation manner of the second aspect, the node information of each station further includes a node location, transmit power, receiver sensitivity, an antenna gain, and an antenna direction.

With reference to the second aspect, or the first to the fourth possible implementation manners of the second aspect, in a fifth possible implementation manner of the second aspect, the optimum working frequency includes an optimum transmit working frequency and an optimum receive working frequency, and the computation module is specifically configured to, when the station to which a frequency needs to be allocated is a node i, and a peer station of the station to which a frequency needs to be allocated is a node j, compute an optimum transmit working frequency of the node i, where the optimum transmit working frequency satisfies at least the following conditions: $P_{i \to j} > RS_j$ and $MIN\{RS_x/P_{i \to x}\} > CI_x$; and compute an optimum receive working frequency of the node i, where the optimum receive working frequency satisfies at least the following conditions: $P_{j \to i} > RS_i$ and $MIN\{RS_i/P_{y \to i}\} > CI_i$, where $P_{i \to j}$ represents received signal strength generated by the node i for the node j when the node i works at a transmit working frequency; $P_{j \to i}$ represents received signal strength generated by the node j for the node i when the node i works at a receive working frequency, $RS_x$ represents receiver sensitivity existing when a node x works in a state of maximum channel bandwidth and a highest modulation mode, $P_{i \to x}$ represents interference signal strength generated by the node i for the node x when the node i works at the transmit working frequency, $RS_x/P_{i \to x}$ represents a carrier-to-interference ratio of the node x, $CI_x$ represents a carrier-to-interference ratio threshold for the node x, the node x is any node or at least one node other than the node i and the node j, and a receive working frequency of the node x is a transmit working frequency selected by the node i or an adjacent frequency of a transmit working frequency selected by the node i; and $RS_i$ represents receiver sensitivity existing when the node i works in the state of the maximum channel bandwidth and the highest modulation mode, $P_{y \to i}$ represents interference signal strength generated by a node y for the node i when the node i works at the receive working frequency, $RS_i/P_{y \to i}$ represents a carrier-to-interference ratio of the node i, $CI_t$ represents a carrier-to-interference ratio threshold for the node i, the node y is any node or at least one node other than the node i and the node j, and a transmit working frequency of the node y is a receive working frequency selected by the node i or an adjacent frequency of a receive working frequency selected by the node i.

With reference to the second aspect, or the first to the fifth possible implementation manner of the second aspect, in a sixth possible implementation manner of the second aspect, the control device further includes a connection establishment module, configured to disconnect the dedicated channel, and establish, by using the optimum working frequency, a connection to the station to which a frequency needs to be allocated.

With reference to any one of the second aspect, or the first to the sixth possible implementation manners of the second aspect, in a seventh possible implementation manner of the second aspect, the dedicated channel includes any one of a virtual local area network VLAN connection, a label switched path LSP connection, or a physical link connection.

According to a third aspect, an embodiment of the present invention provides a system in a microwave network, including a control device and at least one station, where the at least one station is configured to send a frequency allocation message by using a dedicated channel, and the frequency allocation message carries a node identifier and received signal strength information on a frequency, and the control device is configured to determine, according to the frequency allocation message, a station to which a frequency needs to be allocated, and obtain node information of each station in the network; and compute, according to the received signal strength information on the frequency of the station to which a frequency needs to be allocated and the node information of each station, an optimum working frequency of the station to which a frequency needs to be allocated, and allocate the optimum working frequency to the station to which a frequency needs to be allocated.

With reference to the third aspect, in a first possible implementation manner of the third aspect, the control device is specifically configured to receive, by using the dedicated channel, the frequency allocation message of the station to which a frequency needs to be allocated, where the frequency allocation message is a frequency allocation request message; and determine, according to a node identifier carried in the frequency allocation request message, that a station which sends the frequency allocation request message is the station to which a frequency needs to be allocated.

With reference to the third aspect or the first possible implementation manner of the third aspect, in a second possible implementation manner of the third aspect, the control device is specifically configured to receive a frequency allocation message of each station by using the dedicated channel, where the frequency allocation message of each station carries a node identifier and received signal strength information on a frequency of each station, and the received signal strength information on the frequency of each station includes interference signal strength; and when the interference signal strength is greater than a preset threshold, determine that a station whose interference signal strength is greater than the preset threshold is the station to which a frequency needs to be allocated.

According to a fourth aspect, a computer device is provided, including a processor and a memory, where the memory is configured to store an execution instruction of the computer device, and when the computer device is running, the processor executes the execution instruction of the computer device stored in the memory, so that the computer device executes the method according to the first aspect or any possible implementation manner of the first aspect.

According to the technical solutions provided by the embodiments of the present invention, a centralized controller is disposed on a central station in a microwave network; the centralized controller receives a node identifier and received signal strength on a frequency of a station by using a dedicated channel, and determines a station to which a frequency needs to be allocated. In addition, the centralized controller obtains node information of each station, and computes and allocates, according to received signal strength information on the frequency of the station to which a frequency needs to be allocated and the node information of each station, an optimum working frequency of the station to which a frequency needs to be allocated. In this way, frequency allocation of each station is coordinated, and a conflict is avoided during frequency use. Furthermore, automatic frequency allocation is implemented, and labor costs are reduced.

BRIEF DESCRIPTION OF THE DRAWINGS

To describe the technical solutions in the embodiments of the present invention more clearly, the following briefly describes the accompanying drawings required for describing the embodiments.

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are only used to explain the present invention but are not intended to limit the present invention.

Figure 1:
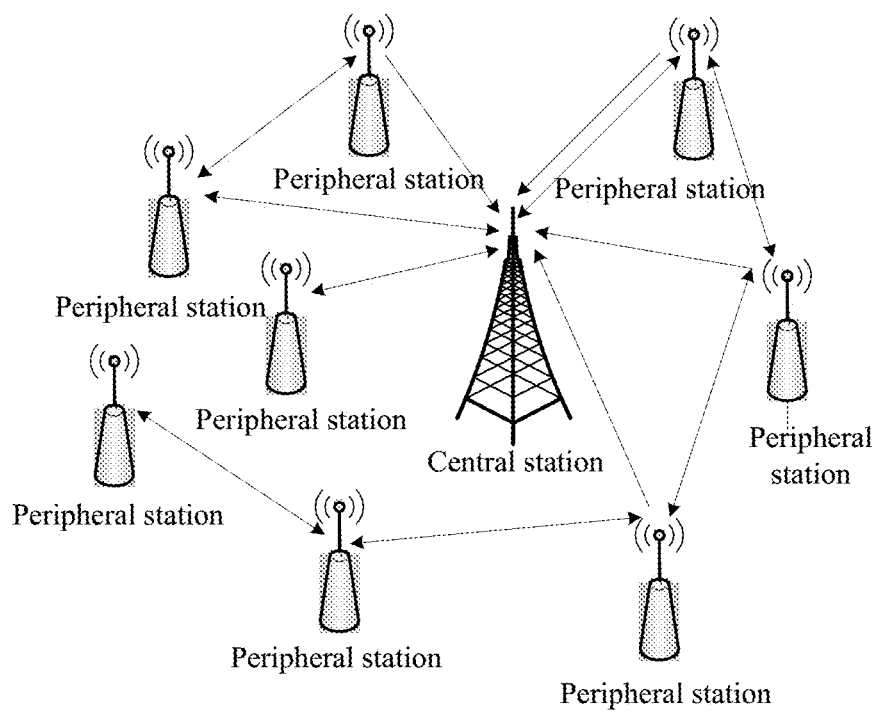
FIG. 1 is a network architecture diagram of a microwave network.

FIG. 1 is a network architecture diagram of a microwave network. As shown in FIG. 1, the microwave network includes one central station (central station) and at least one peripheral station (peripheral station), and the peripheral station is connected to the central station by using a microwave link.

Because the microwave link is located in an open environment and is susceptible to interference, when the central station or the peripheral station is deployed or works, the interference needs to be avoided to ensure link quality. When the central station or the peripheral station is deployed, interference of a frequency signal that has been used at a station location needs to be avoided to select a working frequency. In a working process of the central station or the peripheral station, when a working frequency of the central station or the peripheral station is seriously interfered, another frequency needs to be selected to avoid the interference. In the embodiments of the present invention, a centralized controller, for example, an SDN (software defined networking) controller, is disposed on the central station, and the SDN controller coordinates working frequency allocation of each station, and implements automatic frequency selection and allocation. It should be noted that a node is a concept of a station in a network topology structure, and both refer to a same entity.

Figure 2:
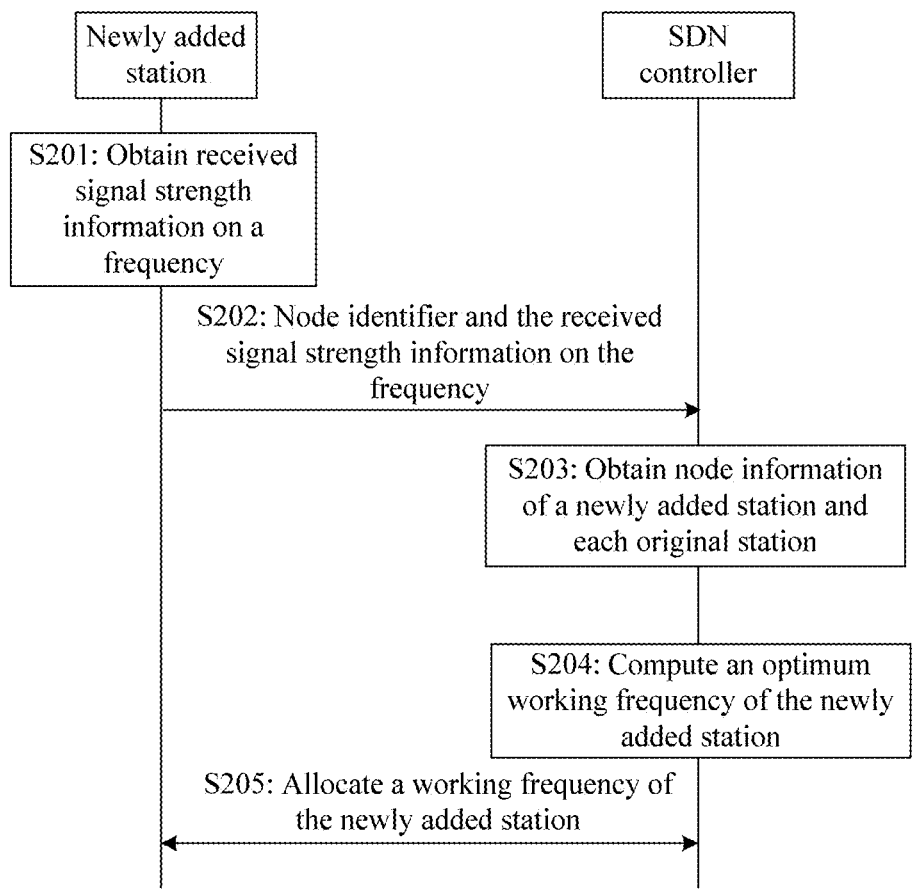
FIG. 2 is a signaling interaction diagram of a frequency allocation method in a microwave network according to an embodiment of the present invention.

FIG. 2 is a signaling interaction diagram of a frequency allocation method in a microwave network according to an embodiment of the present invention. In this embodiment, a centralized controller, for example, but not limited to an SDN controller, is disposed on a central station. The frequency allocation method according to this embodiment may be performed by the SDN controller. When a new station is added to the microwave network, the SDN controller obtains received signal strength information on a frequency of the newly added station and node information of each station, and computes and allocates an optimum working frequency of the newly added station according to the obtained received signal strength information on the frequency of the newly added station and the obtained node information of each station. Specifically, all original stations are specifically stations that have been deployed, and include the central station and a peripheral station.

S201: The newly added station obtains received signal strength information on a frequency.

Specifically, the newly added station obtains, by means of frequency scanning, received signal strength information on each to-be-detected frequency at a location of the newly added station. Specifically, the received signal strength information on the frequency includes received signal strength obtained by the newly added station by switching a working frequency of a receiver circuit to traverse the to-be-detected frequencies, and by detecting each to-to-detected frequency. The to-be-detected frequencies include a candidate working frequency that is preset during network planning, or may be all frequencies within a working frequency band of the newly added station.

S202: The newly added station sends a node identifier and the received signal strength information on the frequency of the newly added station to the SDN controller by using a dedicated channel between the newly added station and the SDN controller.

Specifically, the dedicated channel between the newly added station and the SDN controller may be established according to the following implementation manner. An idle frequency is selected, where the idle frequency may be a dedicated narrowband frequency allocated from each frequency band, an unused working frequency, or a frequency of another frequency band; the newly added station establishes a connection to an original peripheral station by using the idle frequency, connects to the microwave network, and further establishes a connection to the SDN controller on the central station, or the newly added station directly establishes a connection to the SDN controller on the central station by using the idle frequency. Specifically, the dedicated channel established between the newly added station and the SDN controller may be a VLAN (virtual local area network) connection, an LSP (label switched path) connection, or a physical link connection. Optionally, the newly added station may first establish a dedicated channel connection to the SDN controller, and then performs step S201.

Specifically, the newly added station sends the node ID (identifier) and the received signal strength information on the frequency of the newly added station to the SDN controller by using the dedicated channel between the newly added station and the SDN controller. The node ID may be used to identify the newly added station, and the received signal strength information on the frequency includes the received signal strength information on each to-be-detected frequency at the location of the newly added station.

S203: The SDN controller obtains node information of the newly added station and all original stations.

Specifically, the original stations are specifically stations that have been deployed, and include the central station and a peripheral station. The SDN controller obtains the node information of the newly added station and the original stations in two implementation manners. In one implementation manner, the SDN controller pre-stores node IDs of the newly added station and the original stations, and a node location, transmit power, receiver sensitivity, a modulation mode, spectrum bandwidth, an antenna gain, an antenna direction, and other information of each station. The SDN controller may query for the node location, the transmit power, the receiver sensitivity, the modulation mode, the spectrum bandwidth, the antenna gain, the antenna direction, and other information of each station according to the node IDs. In the other manner, the SDN controller obtains the node information of the newly added station and the original stations by using the dedicated channel. The node information includes a node ID of each station, and further includes a node location, transmit power, receiver sensitivity, a modulation mode, spectrum bandwidth, an antenna gain, an antenna direction, and other information of each station. Optionally, the node information of the newly added station may be sent to the SDN controller in step S202.

Optionally, the SDN controller may further obtain received signal strength information on a frequency of the original stations by using the dedicated channel, and specifically, may obtain, by means of frequency scanning, received signal strength information on each to-be-detected frequency at a location of each original station. A dedicated channel between the SDN controller and each original station may include a VLAN connection, an LSP connection, or a physical link connection. A manner of establishing the dedicated channel is described in step S202, and details are not described herein again.

S204: The SDN controller computes an optimum working frequency of the newly added station.

The SDN controller computes the optimum working frequency of the newly added station according to the obtained node information and received signal strength information on a frequency of the newly added station and the obtained node information of the original stations. The optimum working frequency includes an optimum transmit working frequency and an optimum receive working frequency. A specific implementation manner of computing the optimum working frequency of the newly added station is as follows.

It is assumed that the newly added station is a node i, a peer station is a node j, and the node i directly establishes a connection to the peer node j, so as to connect to the microwave network.

An optimum transmit working frequency of the node i is computed, where the optimum transmit working frequency satisfies at least the following conditions.

$$P_{i \to j} > RS_j \text{ and } MIN\{RS_x/P_{i \to x}\} > CI_x; \qquad (1)$$

An optimum receive working frequency of the node i is computed, where the optimum receive working frequency satisfies at least the following conditions.

$$P_{j \to i} > RS_i \text{ and } MIN\{RS_i/P_{y \to i}\} > CI_i. \qquad (2)$$

$P_{i \to j}$ represents received signal strength generated by the node i for the node j when the node i works at a transmit working frequency.

$P_{j \to i}$ represents received signal strength generated by the node j for the node i when the node i works at a receive working frequency.

$RS_x$ represents receiver sensitivity (Receiver Sensitivity) existing when a node x works in a state of maximum channel bandwidth and a highest modulation mode, $P_{i \to x}$ represents interference signal strength generated by the node i for the node x when the node i works at the transmit working frequency, $RS_x/P_{i \to x}$ represents a carrier-to-interference ratio of the node x, $CI_x$ represents a carrier-to-interference ratio threshold for the node x, the node x is any node or at least one node other than the node i and the node j, and a receive working frequency of the node x is a transmit working frequency selected by the node i or an adjacent frequency of a transmit working frequency selected by the node i.

$RS_i$ represents receiver sensitivity existing when the node i works in the state of the maximum channel bandwidth and the highest modulation mode, $P_{y \to i}$ represents interference signal strength generated by a node y for the node i when the node i works at the receive working frequency, $RS_i/P_{y \to i}$ represents a carrier-to-interference ratio of the node i, $CI_i$ represents a carrier-to-interference ratio threshold for the node i, the node y is any node or at least one node other than the node i and the node j, and a transmit working frequency of the node y is a receive working frequency selected by the node i or an adjacent frequency of a receive working frequency selected by the node i.

Specifically, received signal strength information on a frequency of the node i includes $P_{j \to i}$ and $P_{y \to i}$, and may be obtained in step S201. Node information of the node i includes $RS_i$, node information of the node j includes $RS_j$, node information of the node x includes $RS_x$, and these node information may be obtained in step S203.

$$P_{i \to j} = EIRP_i - \text{Attenuation}(D_{i \to j}) \qquad (3)$$

$$P_{i \to x} = EIRP_i - \text{Attenuation}(D_{i \to x}) \qquad (4)$$

$EIRP_i$ represents a sum of transmit power and an antenna gain of the node i, Attenuation($D_{i \to j}$) represents a transmission loss between the node i and the node j and is related to a distance between the node i and the node j, and Attenuation($D_{i \to x}$) represents a transmission loss between the node i and the node x and is related to a distance between the node i and the node x. There are two manners of obtaining $P_{i \to j}$ and $P_{i \to x}$. In one manner, an SDN controller obtains the node information of the node i, for example, $EIRP_i$ and a node location of the node i, and the node information of the node j and the node x, for example, node locations of the node j and the node x, obtains the transmission losses Attenuation($D_{i \to j}$) and Attenuation($D_{i \to x}$) according to the node locations of the node i, the node j, and the node x, and obtains $P_{i \to j}$ and $P_{i \to x}$ respectively according to the formulas (3) and (4). In the other manner, the received signal strength information on each to-to-detected frequency is obtained by means of frequency scanning on the node j and the node x and is sent to the SDN controller; the SDN controller obtains $P_{i \to j}$ and $P_{i \to x}$ from the received signal strength information.

If the receive working frequency of the node x is the transmit working frequency selected by the node i, and $RS_x/P_{i \to x}$ is a co-channel carrier-to-interference ratio (Co-Channel Carrier to Interference Ratio), $CI_x$ is a co-channel carrier-to-interference ratio threshold. Alternatively, if the receive working frequency of the node x is the adjacent frequency of the transmit working frequency selected by the node i, and $RS_x/P_{i \to x}$ is an adjacent channel carrier-to-interference ratio (Adjacent Channel Carrier to Interference Ratio), $CI_x$ is an adjacent channel carrier-to-interference ratio threshold. If the transmit working frequency of the node y is the receive working frequency selected by the node i, and $RS_i/P_{y \to i}$ is a co-channel carrier-to-interference ratio, $CI_i$ is a co-channel carrier-to-interference ratio threshold. Alternatively, if the transmit working frequency of the node y is the adjacent frequency of the receive working frequency selected by the node i, and $RS_i/P_{y \to i}$ is an adjacent channel carrier-to-interference ratio, $CI_i$ is an adjacent channel carrier-to-interference ratio threshold.

In a specific implementation process, if more than one working frequency satisfies the foregoing conditions, a frequency having a maximum $MIN\{RS_x/P_{i \to x}\}$ is selected as the optimum transmit working frequency of the node i, and a frequency having a maximum $MIN\{RS_i/P_{y \to i}\}$ is selected as the optimum receive working frequency of the node i. In a microwave network in which a time division multiplexing technology is used, the optimum transmit working frequency and the optimum receive working frequency of the node i are a same frequency. In a microwave network in which a frequency division multiplexing technology is used, the optimum transmit working frequency and the optimum receive working frequency of the node i are different frequencies.

In a specific implementation process, if no transmit working frequency of the node i satisfies the formula (1) and/or no receive working frequency thereof satisfies the formula (2), the SDN controller may change working frequencies of the original stations, so that the newly added station can select a working frequency. Step S204 specifically includes the following steps.

S204a: The SDN controller determines, according to the obtained node information of the original stations, a station whose frequency is to be changed.

The station whose frequency is to be changed includes a set of all original stations that may affect working frequency selection and allocation of the newly added station. Specifically, the station whose frequency is to be changed may include all original stations with antenna directions towards the newly added station.

S204b: The SDN controller determines, according to obtained received signal strength information on a frequency of the station whose frequency is to be changed, a candidate transmit working frequency and a candidate receive working frequency of the station whose frequency is to be changed.

Specifically, a frequency whose carrier-to-interference ratio is greater than or equal to a preset carrier-to-interference ratio threshold is selected as the candidate transmit working frequency, and according to a rule of matching a working frequency in a transmission direction with a working frequency in a receiving direction, a corresponding frequency may be selected as the candidate receive working frequency according to a TR (Transmit-Receive) interval. Specifically, the SDN controller traverses candidate working frequencies of transmission at the station whose frequency is to be changed; after a transmit working frequency of the station whose frequency is to be changed is changed as a candidate transmit working frequency, computes interference caused to other original stations working at the candidate transmit working frequency or an adjacent frequency of the candidate transmit working frequency, and selects a candidate transmit working frequency that does not affect the other original stations. Specifically, with regard to any original station m working at the candidate transmit working frequency or the adjacent frequency of the candidate transmit working frequency and a station n whose frequency is to be changed, $MIN\{RS_m/P_{n \to m}\} > CI_m$ should be satisfied.

S204c: The SDN controller traverses one or more candidate working frequencies of the station whose frequency is to be changed, computes the optimum transmit working frequency of the newly added station according to the formula (1), and computes the optimum receive working frequency of the newly added station according to the formula (2).

S205: The SDN controller allocates a working frequency of the newly added station.

The SDN controller allocates the computed optimum working frequency to the newly added station by using the dedicated channel between the newly added station and the SDN controller. Optionally, if the working frequency of the newly added station is obtained by changing a working frequency of an original station, the SDN controller further needs to allocate a working frequency of the station whose frequency is to be changed.

It should be noted that, if a connection by which the newly added station connects to the microwave network is established by using an idle frequency, the newly added station disconnects the connection based on the idle frequency after allocating the working frequency, connects to the microwave network by using the allocated working frequency, and establishes a connection to the SDN controller.

If there are multiple newly added stations in the microwave network, working frequencies in the entire network can be allocated by repeatedly performing step S201 to step S205.

According to this embodiment of the present invention, an SDN controller is disposed on a central station, and when a new station is added to a microwave network, the SDN controller obtains a node identifier and received signal strength information on a frequency of the newly added station by using a dedicated channel, obtains node information of the newly added station and original stations, and computes and allocates an optimum working frequency to the newly added station according to the obtained received signal strength information on the frequency of the newly added station and the obtained node information of each station. This resolves a problem of manual intervention required for frequency allocation, implements automatic frequency allocation, improves frequency allocation efficiency, and reduces costs.

Figure 3:
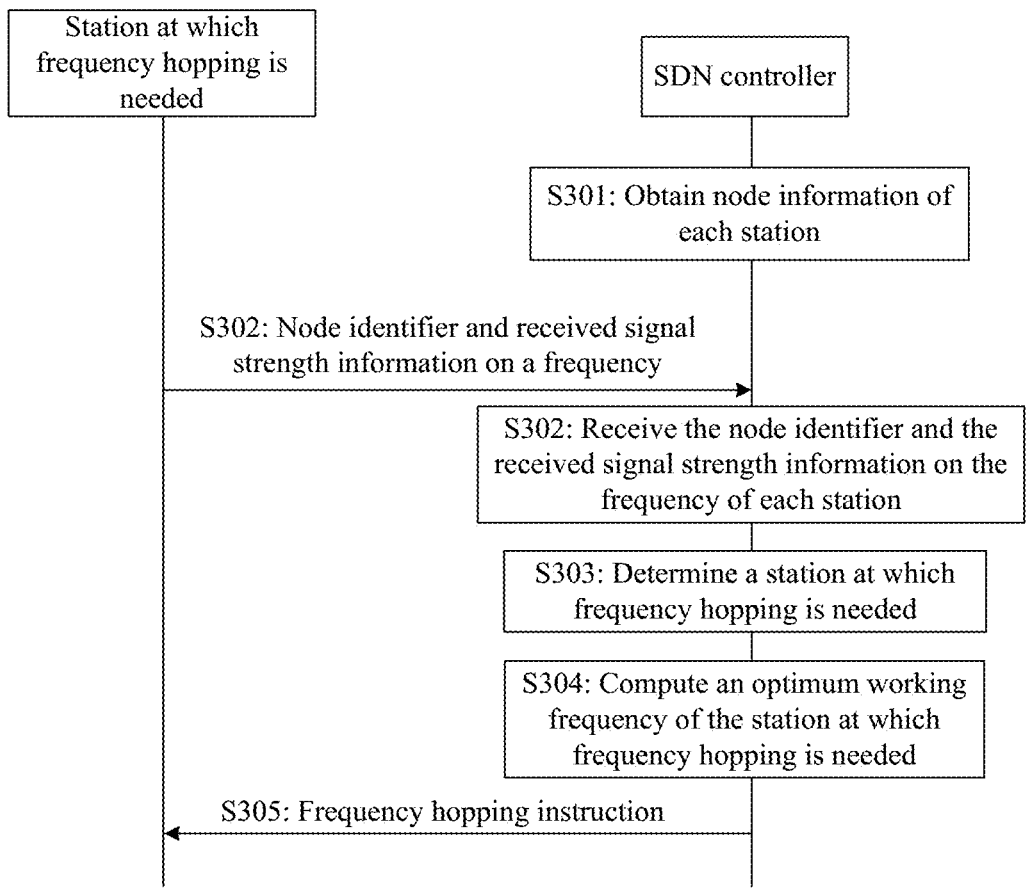
FIG. 3 is a signaling interaction diagram of another frequency allocation method in a microwave network according to an embodiment of the present invention.

FIG. 3 is a signaling interaction diagram of a frequency allocation method in a microwave network according to an embodiment of the present invention. Because microwave links easily interfere with each other, when working frequencies of one or more stations are seriously interfered, another frequency needs to be selected for frequency hopping. In this embodiment, a centralized controller, for example, but not limited to an SDN controller, is disposed on a central station. The frequency allocation method in the microwave network according to this embodiment may be performed by the SDN controller. The SDN controller obtains node information and received signal strength information on a frequency of each station, and when there is a station at which frequency hopping is needed, the SDN controller computes and allocates, according to the received signal strength information on the frequency of the station at which frequency hopping is needed and the node information of each station, a working frequency of the station at which frequency hopping is needed. In this embodiment, the stations include the central station and a peripheral station.

S301: The SDN controller obtains node information of each station.

In a specific implementation process, the SDN controller obtains the node information of each station in two implementation manners. In one implementation manner, the SDN controller pre-stores the node information of each station, including a node ID, and a node location, transmit power, receiver sensitivity, a modulation mode, spectrum bandwidth, an antenna gain, an antenna direction, and other information of each station The SDN controller may query for the node location, the transmit power, the receiver sensitivity, the modulation mode, the spectrum bandwidth, the antenna gain, the antenna direction, and other information of each station according to the node ID of each station. In the other manner, after all stations are connected to the microwave network, the SDN controller obtains the node information of each station by using the dedicated channel. The node information includes a node ID of each station, and further includes a node location, transmit power, receiver sensitivity, a modulation mode, spectrum bandwidth, an antenna gain, an antenna direction, and other information of each station.

S302: The SDN controller receives a node identifier and received signal strength information on a frequency of each station by using a dedicated channel between the SDN controller and each station.

In a specific implementation process, the SDN controller receives the node ID and the received signal strength information on the frequency of each station by using a dedicated channel between the SDN controller and each station. The dedicated channel may specifically include a VLAN connection, an LSP connection, or a physical link connection. Specifically, a manner of establishing the dedicated channel is described in detail in step S202, and details are not described herein again. The node ID may be used to identify each station. Each station detects received signal strength information on a to-be-detected frequency at a location of each station by means of frequency scanning. The received signal strength information includes received signal strength, detected in real time, of a working frequency during service transmission, and further includes received signal strength on each to-be-detected frequency detected at a service transmission interval or detected by using an extra detection circuit to traverse all to-be-detected frequencies by switching a working frequency of a receiver circuit.

S303: The SDN controller determines a station at which frequency hopping is needed.

In one implementation manner, an interference signal strength threshold of each station is set in the SDN controller, and when determining, from the received node ID and received signal strength information on a frequency of each station, that interference signal strength of one or more stations is greater than the preset threshold, the SDN controller determines that a station whose interference signal strength is greater than the threshold is the station at which frequency hopping is needed.

In another implementation manner, an interference signal strength threshold is set in each station, and when one or more stations detect that interference signal strength is greater than the preset threshold, frequency hopping is needed. The station at which frequency hopping is needed sends a frequency hopping request to the SDN controller, and may also send a node ID and received signal strength information on a frequency of the station to the SDN controller. The SDN controller determines, according to the node ID, the station at which frequency hopping is needed. In this implementation manner, optionally, the SDN controller may receive node IDs and received signal strength information on a frequency of other stations after receiving the frequency hopping request.

S304: The SDN controller computes an optimum working frequency of the station at which frequency hopping is needed.

The SDN controller computes, according to the collected node information and received signal strength information on a frequency of each station, the optimum working frequency of the station at which frequency hopping is needed. Specifically, an optimum transmit working frequency of the station at which frequency hopping is needed satisfies at least the formula (1), and an optimum receive working frequency thereof satisfies at least the formula (2). When no working frequency satisfies the foregoing conditions, the SDN controller may change working frequencies of other stations, so that the station at which frequency hopping is needed can select a working frequency. A specific implementation manner is described in detail in step S204, and details are not described herein again.

S305: The SDN controller sends a frequency hopping instruction.

The SDN controller sends the frequency hopping instruction to the station at which frequency hopping is needed, and allocates the computed optimum working frequency to the station at which frequency hopping is needed.

After frequency hopping is completed at one station, because microwave links easily interfere with each other, another station may be affected by a working frequency of the station at which frequency hopping is completed, and therefore need to perform frequency hopping. In this way, step S302 to step S305 are performed repeatedly to coordinate working frequency allocation of each station.

According to this embodiment of the present invention, an SDN controller is disposed on a central station, and the SDN controller receives node information and received signal strength information on a frequency of each station by using a dedicated channel, determines one or more stations at which frequency hopping is needed, and computes and allocates, according to received signal strength information on a frequency of the station at which frequency hopping is needed and the node information of each station, an optimum working frequency of the station at which frequency hopping is needed. This resolves problems of a frequency hopping conflict and required manual intervention during frequency hopping at a station in a microwave network, implements automatic frequency hopping at the station, improves frequency hopping efficiency, reduces costs, and further coordinates frequency hopping in the entire network.

Figure 4:
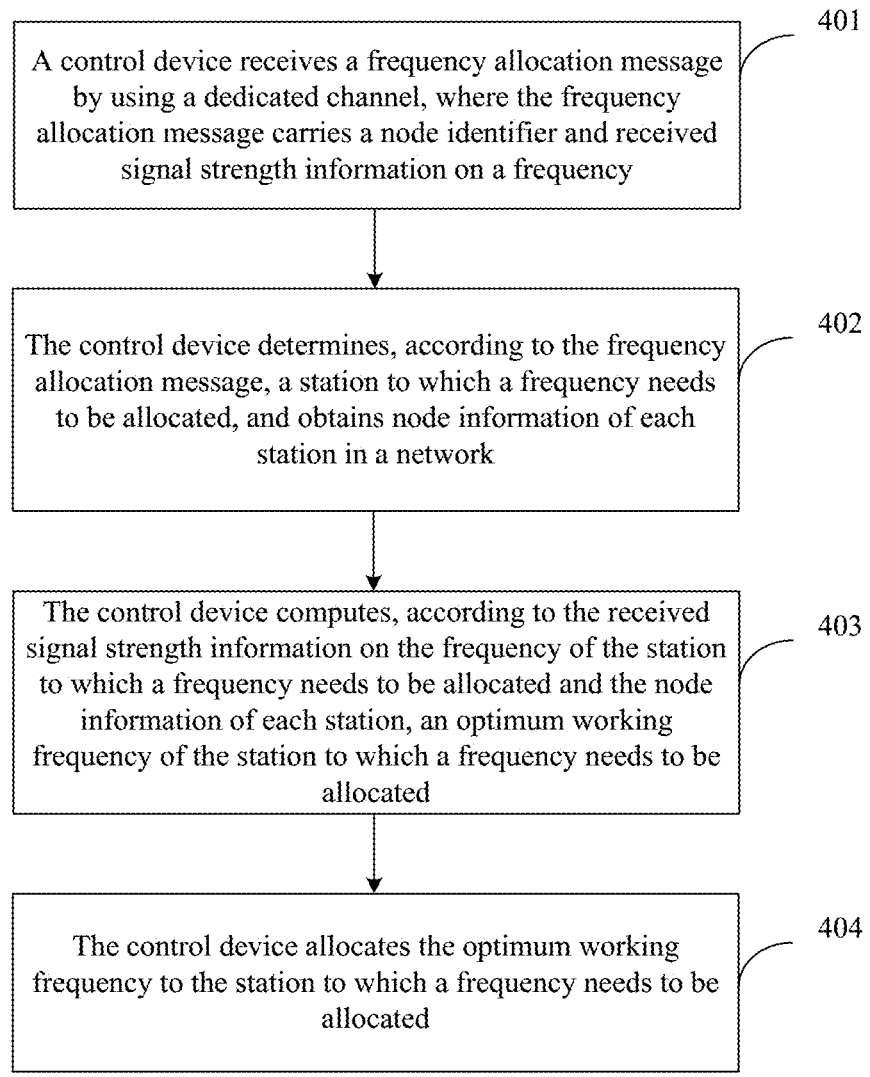
FIG. 4 is an example of a flowchart of a frequency allocation method in a microwave network according to an embodiment of the present invention.

FIG. 4 is an example of a flowchart of a frequency allocation method in a microwave network according to an embodiment of the present invention. Specifically, the method is applied to the microwave network, and may be performed by a centralized controller, including but not limited to an SDN controller. The method includes the following steps.

S401: A control device receives a frequency allocation message by using a dedicated channel, where the frequency allocation message carries a node identifier and received signal strength information on a frequency.

Specifically, the dedicated channel may include any one of a virtual local area network VLAN connection, a label switched path LSP connection, or a physical link connection. The frequency allocation message carries a node identifier and received signal strength information on a frequency of a station that sends the message. The node identifier may be used to identify the station, and the received signal strength information on the frequency is received signal strength information on each to-be-detected frequency at a location of the station.

S402: The control device determines, according to the frequency allocation message, a station to which a frequency needs to be allocated, and obtains node information of each station in the network.

Specifically, the station to which a frequency needs to be allocated includes a newly added station, or a station at which frequency hopping is needed in the network. In a specific implementation process, the control device determines, in two implementation manners according to the frequency allocation message, the station to which a frequency needs to be allocated. In one implementation manner, the frequency allocation message is specifically a frequency allocation request message. When the microwave network includes one or more stations to which a frequency needs to be allocated, the station to which a frequency needs to be allocated sends an allocation request message to the control device by using the dedicated channel, and the control device determines, according to a node identifier carried in the frequency allocation request message, that the station which sends the frequency allocation request message is the station to which a frequency needs to be allocated. In the other implementation manner, an interference signal strength threshold of each station is preset in the control device. The control device receives frequency allocation message of each station by using the dedicated channel, the frequency allocation message of each station carries a node identifier and received signal strength information on a frequency of each station, and the received signal strength information on the frequency of each station includes interference signal strength. When the interference signal strength is greater than a preset threshold, the control device determines that a station whose interference signal strength is greater than the preset threshold is the station to which a frequency needs to be allocated.

Specifically, the node information of each station includes a node identifier, a node location, transmit power, receiver sensitivity, an antenna gain, an antenna direction, and other information.

S403: The control device computes, according to the received signal strength information on the frequency of the station to which a frequency needs to be allocated and the node information of each station, an optimum working frequency of the station to which a frequency needs to be allocated.

Specifically, the optimum working frequency includes an optimum transmit working frequency and an optimum receive working frequency. The optimum transmit working frequency satisfies at least the formula (1), and the optimum receive working frequency satisfies at least the formula (2). When no working frequency in the network satisfies the foregoing conditions, the control device may change working frequencies of other stations, so that the station to which a frequency needs to be allocated can select a working frequency. Specifically, the control device obtains the received signal strength information on the frequency of each station in the network by using the dedicated channel to determine a station whose frequency is to be changed, obtains, from a working frequency of the station whose frequency is to be changed, the optimum working frequency of the station to which a frequency needs to be allocated, and re-computes an optimum working frequency of the station whose frequency is to be changed.

S404: The control device allocates the optimum working frequency to the station to which a frequency needs to be allocated.

Specifically, the control device may allocate, by using the dedicated channel, the optimum working frequency to the station to which a frequency needs to be allocated. If a working frequency of the newly added station is obtained by changing the working frequency of the station whose frequency is to be changed, the SDN controller further needs to allocate the working frequency of the station whose frequency is to be changed.

After allocation is completed, the control device may disconnect the dedicated channel from the station to which a frequency needs to be allocated, and establish a new connection by using the allocated optimum working frequency.

According to this embodiment of the present invention, a control device receives a node identifier and received signal strength on a frequency of a station by using a dedicated channel and determines a station to which a frequency needs to be allocated. In addition, the control device obtains node information of each station, and computes and allocates, according to received signal strength information on the frequency of the station to which a frequency needs to be allocated and the node information of each station, an optimum working frequency of the station to which a frequency needs to be allocated. In this way, frequency allocation of each station is coordinated, and a conflict is avoided during frequency use. Furthermore, automatic frequency allocation is implemented, and labor costs are reduced.

Figure 5:
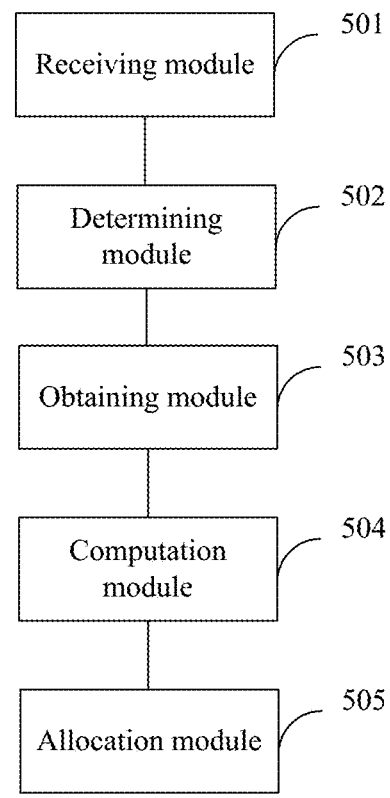
FIG. 5 is a schematic diagram of a logical structure of a control device according to an embodiment of the present invention.

FIG. 5 is a schematic diagram of a logical structure of a control device according to an embodiment of the present invention. Specifically, the control device may be a centralized controller, including but not limited to an SDN controller. As shown in FIG. 5, the control device specifically includes a receiving module 501, a determining module 502, an obtaining module 503, a computation module 504, and an allocation module 505.

The receiving module 501 is configured to receive a frequency allocation message by using a dedicated channel. The frequency allocation message carries a node identifier and received signal strength information on a frequency.

Specifically, the dedicated channel may include any one of a virtual local area network VLAN connection, a label switched path LSP connection, or a physical link connection. The frequency allocation message carries a node identifier and received signal strength information on a frequency of a station that sends the message. The node identifier may be used to identify the station, and the received signal strength information on the frequency is received signal strength information on each to-be-detected frequency at a location of the station.

The determining module 502 is configured to determine, according to the frequency allocation message, a station to which a frequency needs to be allocated.

Specifically, the station to which a frequency needs to be allocated includes a newly added station, or a station at which frequency hopping is needed in the network. In a specific implementation process, the determining module 502 determines, in two implementation manners, that a station which sends the frequency allocation message is the station to which a frequency needs to be allocated. In one implementation manner, the frequency allocation message is specifically a frequency allocation request message. When the microwave network includes one or more stations to which a frequency needs to be allocated, the station to which a frequency needs to be allocated sends an allocation request message to the control device by using the dedicated channel, and the determining module 502 determines, according to a node identifier carried in the frequency allocation request message, that the station which sends the frequency allocation request message is the station to which a frequency needs to be allocated. In the other implementation manner, an interference signal strength threshold of each station is preset in the control device. The receiving module 501 receives frequency allocation message of each station by using the dedicated channel, the frequency allocation message of each station carries a node identifier and received signal strength information on a frequency of each station, and the received signal strength information on the frequency of each station includes interference signal strength. When the interference signal strength is greater than a preset threshold, the determining module 502 determines that a station whose interference signal strength is greater than the preset threshold is the station to which a frequency needs to be allocated.

The obtaining module 503 is configured to obtain node information of each station in the network.

Specifically, the node information of each station includes a node identifier, a node location, transmit power, receiver sensitivity, an antenna gain, an antenna direction, and other information.

The computation module 504 is configured to compute, according to the received signal strength information on the frequency of the station to which a frequency needs to be allocated and the node information of each station, an optimum working frequency of the station to which a frequency needs to be allocated.

Specifically, the optimum working frequency includes an optimum transmit working frequency and an optimum receive working frequency. The optimum transmit working frequency satisfies at least the formula (1), and the optimum receive working frequency satisfies at least the formula (2). When no working frequency in the network satisfies the foregoing conditions, the determining module 502 may change working frequencies of other stations, so that the station to which a frequency needs to be allocated can select a working frequency. Specifically, the receiving module 501 obtains the received signal strength information on the frequency of each station in the network by using the dedicated channel, the determining module 502 determines a station whose frequency is to be changed, and the computation module 504 is configured to obtain, from a working frequency of the station whose frequency is to be changed, the optimum working frequency of the station to which a frequency needs to be allocated, and re-compute an optimum working frequency of the station whose frequency is to be changed.

The allocation module 505 is configured to allocate the optimum working frequency to the station to which a frequency needs to be allocated.

Specifically, the allocation module 505 may allocate, by using the dedicated channel, the optimum working frequency to the station to which a frequency needs to be allocated. If a working frequency of the newly added station is obtained by changing the working frequency of the station whose frequency is to be changed, the SDN controller further needs to allocate the working frequency of the station whose frequency is to be changed.

Optionally, the control device further includes a connection establishment module. The connection establishment module is configured to disconnect, after allocation is completed, the dedicated channel from the station to which a frequency needs to be allocated, and establish a new connection by using the allocated optimum working frequency.

According to this embodiment of the present invention, a control device receives a node identifier and received signal strength on a frequency of a station by using a dedicated channel and determines a station to which a frequency needs to be allocated. In addition, the control device obtains node information of each station, and computes and allocates, according to received signal strength information on the frequency of the station to which a frequency needs to be allocated and the node information of each station, an optimum working frequency of the station to which a frequency needs to be allocated. In this way, frequency allocation of each station is coordinated, and a conflict is avoided during frequency use. Furthermore, automatic frequency allocation is implemented, and labor costs are reduced.

Figure 6:
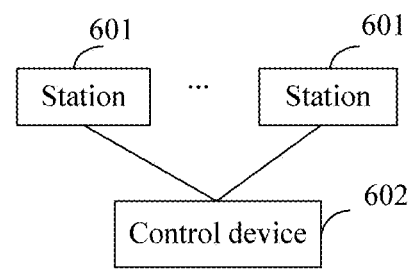
FIG. 6 is a schematic diagram of a logical structure of a system in a microwave network according to an embodiment of the present invention.

FIG. 6 is a schematic diagram of a logical structure of a system in a microwave network according to an embodiment of the present invention. As shown in FIG. 6, the system in the microwave network includes at least one station 601, configured to send a frequency allocation message by using a dedicated channel, where the frequency allocation message carries a node identifier and received signal strength information on a frequency, and a control device 602, configured to: determine, according to the frequency allocation message, a station to which a frequency needs to be allocated, and obtain node information of each station in the network; and compute, according to the received signal strength information on the frequency of the station to which a frequency needs to be allocated and the node information of each station, an optimum working frequency of the station to which a frequency needs to be allocated, and allocate the optimum working frequency to the station to which a frequency needs to be allocated.

According to this embodiment of the present invention, a control device receives a node identifier and received signal strength on a frequency of a station by using a dedicated channel and determines a station to which a frequency needs to be allocated. In addition, the control device obtains node information of each station, and computes and allocates, according to received signal strength information on the frequency of the station to which a frequency needs to be allocated and the node information of each station, an optimum working frequency of the station to which a frequency needs to be allocated. In this way, frequency allocation of each station is coordinated, and a conflict is avoided during frequency use. Furthermore, automatic frequency allocation is implemented, and labor costs are reduced.

Figure 7:
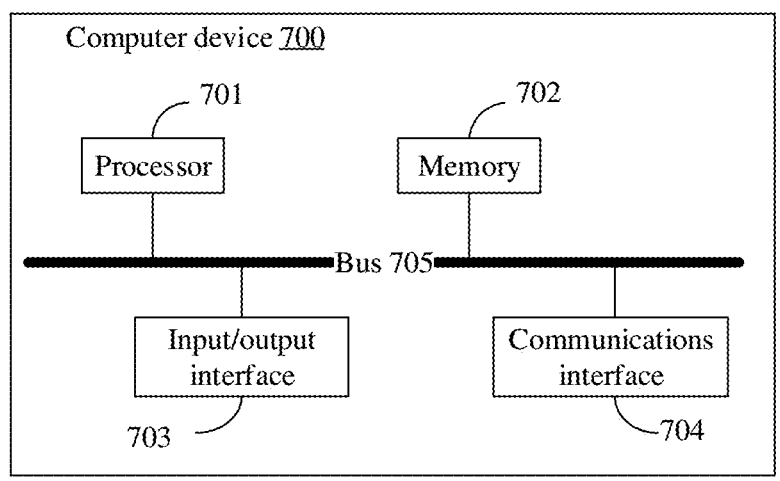
FIG. 7 is a schematic diagram of a logical structure of a computer device according to an embodiment of the present invention.

FIG. 7 is a schematic diagram of a logical structure of a computer device according to an embodiment of the present invention. As shown in FIG. 7, the computer device 700 includes a processor 701, a memory 702, an input/output interface 703, a communications interface 704, and a bus 705. The processor 701, the memory 702, the input/output interface 703, and the communications interface 704 implement mutual communication connections by using the bus 705.

The processor 701 may use a general-purpose central processing unit (CPU), a microprocessor, an application-specific integrated circuit (ASIC), or at least one integrated circuit, and is configured to perform a related program, so as to implement the technical solution provided in this embodiment of the present invention.

The memory 702 may be a read-only memory (ROM), a static storage device, a dynamic storage device, or a random access memory (RAM). The memory 702 may store an operating system and another application. When the technical solution provided in this embodiment of the present invention is implemented by using software or firmware, program code used to implement the technical solution provided in this embodiment of the present invention is stored in the memory 702 and is performed by the processor 701.

The input/output interface 703 is configured to receive entered data and information, and output an operation result and other data.

The communications interface 704 uses, for example, but not limited to a transceiver apparatus such as a transceiver, to implement communication between the computer device 700 and another device or a communications network.

The bus 705 may include a path that transmits information between the components (for example, the processor 701, the memory 702, the input/output interface 703, and the communications interface 704) of the computer device 700.

In a specific implementation process, the computer device 700 receives a frequency allocation message from a dedicated channel by using the communications interface 704, where the frequency allocation message carries a node identifier and received signal strength information on a frequency; executes, by using the processor 701, the code stored in the memory 702 to determine, according to the frequency allocation message, a station to which a frequency needs to be allocated; and obtains node information of each station in the network by using the communications interface 704. The computer device 700 executes, by using the processor 701, the code stored in the memory 702; computes, according to the received signal strength information on the frequency of the station to which a frequency needs to be allocated and the node information of each station, an optimum working frequency of the station to which a frequency needs to be allocated; and allocates, by using the communications interface 704, the optimum working frequency to the station to which a frequency needs to be allocated.

It should be noted that, although the computer device 700 shown in FIG. 7 shows only the processor 701, the memory 702, the input/output interface 703, the communications interface 704, and the bus 705, in a specific implementation process, a person skilled in the art should understand that the computer device 700 further includes another component necessary for normal running. In addition, according to a specific need, a person skilled in the art should understand that the computer device 700 may further include a hardware component that implements another additional function. In addition, a person skilled in the art should understand that the computer device 700 may alternatively include only a component necessary for implementing this embodiment of the present invention, and may not necessarily include all components shown in FIG. 7.

According to this embodiment of the present invention, a control device receives a node identifier and received signal strength on a frequency of a station by using a dedicated channel and determines a station to which a frequency needs to be allocated. In addition, the control device obtains node information of each station, and computes and allocates, according to received signal strength information on the frequency of the station to which a frequency needs to be allocated and the node information of each station, an optimum working frequency of the station to which a frequency needs to be allocated. In this way, frequency allocation of each station is coordinated, and a conflict is avoided during frequency use. Furthermore, automatic frequency allocation is implemented, and labor costs are reduced.

A person of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may be executed substantially at the same time actually, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are only specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The foregoing are only examples of embodiments of the present invention. A person skilled in the art may make various modifications and variations to the present invention without departing from the spirit and scope of the present invention.

What is claimed is:

1. A frequency allocation method, comprising:

receiving, by a control device, a frequency allocation message using a dedicated channel, wherein the frequency allocation message carries a node identifier and received signal strength information for a frequency;

determining, according to the frequency allocation message, a station needing frequency allocation, and obtaining node information of each station in a network, wherein the node information of each station in the network comprises first node information of a first station other than a station having the control device and other than a station identified by the node identifier, and wherein the first node information comprises an antenna direction of the first station; and computing, according to the received signal strength information for the frequency of the station needing frequency allocation and further according to the node information of each station and the antenna direction of the first station, an optimum working frequency of the station needing frequency allocation, and allocating the optimum working frequency to the station needing frequency allocation;

wherein the station needing frequency allocation is a node i, wherein a station directly connected to the station needing frequency allocation is a node j, and wherein the computing the optimum working frequency of the station needing frequency allocation comprises:

computing an optimum transmit working frequency of the node i, wherein the optimum transmit working frequency satisfies conditions associated with a received signal strength generated by the node i for the node j when the node i works at a transmit working frequency, a receiver sensitivity existing when a third node works in a state of maximum channel bandwidth and a highest modulation mode, a carrier-to-interference ratio of the third node, wherein the third node is at least one node other than the node i and the node j; and computing an optimum receive working frequency of the node i, wherein the optimum receive working frequency satisfies conditions associated with a received signal strength generated by the node j for the node i when the node i works at a receive working frequency, a receiver sensitivity existing when the node i works in the state of the maximum channel bandwidth and the highest modulation mode, a carrier-to-interference ratio of the node i, a carrier-to-interference ratio threshold for the node i.

2. The method according to claim 1, wherein the receiving the frequency allocation message comprises:
receiving, by the control device, using the dedicated channel, the frequency allocation message of the station needing frequency allocation, wherein the frequency allocation message is a frequency allocation request message; and
wherein the determining the station needing frequency allocation comprises:
determining, by the control device according to a node identifier carried in the frequency allocation request message, that a station which sends the frequency allocation request message is the station to which a frequency needs to be allocated.

3. The method according to claim 1, wherein the receiving the frequency allocation message comprises:
receiving, by the control device, a frequency allocation message of each station using the dedicated channel, wherein the frequency allocation message of each station carries a node identifier and received signal strength information for a frequency of each station, and wherein the received signal strength information for the frequency of each station comprises interference signal strength; and
wherein the determining the station needing frequency allocation comprises:
determining, by the control device, when the interference signal strength is greater than a preset threshold, that a station whose interference signal strength is greater than the preset threshold is the station to which a frequency needs to be allocated.

4. The method according to claim 1, wherein the node information of each station comprises the node identifier, and wherein the node identifier identifies the station.

5. The method according to claim 4, wherein the node information of each station further comprises a node location, transmit power, receiver sensitivity, and an antenna gain.

6. The method according to claim 1, wherein the optimum working frequency comprises the optimum transmit working frequency and the optimum receive working frequency; and
wherein the optimum transmit working frequency satisfies at least the following conditions: $P_{j \to i} > RS_x$ and $MIN\{RS_x/P_{i \to x}\} > CI_x$; and
wherein the optimum receive working frequency satisfies at least the following conditions: $P_{j \to i} > RS_i$ and $MIN\{RS_i/P_{y \to i}\} > CI_i$;
wherein $P_{i \to j}$ represents the received signal strength generated by the node i for the node j when the node i works at the transmit working frequency, wherein $P_{j \to i}$ represents the received signal strength generated by the node j for the node i when the node i works at the receive working frequency;
wherein $RS_x$ represents the receiver sensitivity existing when a node x works in the state of maximum channel bandwidth and a highest modulation mode, wherein $P_{i \to x}$ represents interference signal strength generated by the node i for the node x when the node i works at the transmit working frequency, wherein $RS_x/P_{i \to x}$ represents the carrier-to-interference ratio of the node x, wherein $CI_x$ represents the carrier-to-interference ratio threshold for the node x, wherein the node x is any node or at least one node other than the node i and the node j, and wherein a receive working frequency of the node x is a transmit working frequency selected by the node i or an adjacent frequency of a transmit working frequency selected by the node i; and
wherein $RS_i$ represents the receiver sensitivity existing when the node i works in the state of the maximum channel bandwidth and the highest modulation mode, wherein $P_{y \to i}$ represents interference signal strength generated by a node y for the node i when the node i works at the receive working frequency, wherein $RS_i/P_{y \to i}$ represents the carrier-to-interference ratio of the node i, wherein $CI_i$ represents the carrier-to-interference ratio threshold for the node i, wherein the node y is any node or at least one node other than the node i and the node j, and wherein a transmit working frequency of the node y is a receive working frequency selected by the node i or an adjacent frequency of a receive working frequency selected by the node i.

7. The method according to claim 1, wherein the method further comprises performing, after the control device allocates the optimum working frequency to the station needing frequency allocation:
disconnecting, by the control device, the dedicated channel; and
establishing, using the optimum working frequency, a connection to the station needing frequency allocation.

8. The method according to claim 1, wherein the dedicated channel comprises a virtual local area network (VLAN) connection, a label switched path (LSP) connection, or a physical link connection.

9. A control device in a microwave network, the control device comprising:
a receiving module, configured to receive a frequency allocation message using a dedicated channel, wherein the frequency allocation message carries a node identifier and received signal strength information for a frequency;
a processor; and
a non-transitory computer-readable storage medium storing a program to be executed by the processor, the program including instructions to:
determine, according to the frequency allocation message, a station needing frequency allocation;
obtain node information of each station in a network, wherein the node information of each station in the network comprises first node information of a first station other than a station having the control device and other than a station identified by the node identifier, and wherein the first node information comprises an antenna direction of the first station;
compute, according to the received signal strength information on the frequency of the station needing frequency allocation and the node information of each station, and further according to the antenna direction of the first station, an optimum working frequency of the station needing frequency allocation; and
allocate the optimum working frequency to the station needing frequency allocation;

wherein the station needing frequency allocation is a node i, wherein a station directly connected to the station needing frequency allocation is a node j, and wherein the instructions to compute the optimum working frequency of the station needing frequency allocation include instructions to:

compute an optimum transmit working frequency of the node i, wherein the optimum transmit working frequency satisfies conditions associated with a received signal strength generated by the node i for the node j when the node i works at a transmit working frequency, a receiver sensitivity existing when a third node works in a state of maximum channel bandwidth and a highest modulation mode, a carrier-to-interference ratio of the third node, wherein the third node is at least one node other than the node i and the node j; and compute an optimum receive working frequency of the node i, wherein the optimum receive working frequency satisfies conditions associated with a received signal strength generated by the node j for the node i when the node i works at a receive working frequency, a receiver sensitivity existing when the node i works in the state of the maximum channel bandwidth and the highest modulation mode, a carrier-to-interference ratio of the node i, a carrier-to-interference ratio threshold for the node i.

10. The control device according to claim 9, wherein the receiving module is configured to receive, using the dedicated channel, the frequency allocation message of the station needing frequency allocation, wherein the frequency allocation message is a frequency allocation request message; and wherein the instructions to determine the station needing frequency allocation include instructions to:
determine, according to a node identifier carried in the frequency allocation request message, that a station which sends the frequency allocation request message is the station needing frequency allocation.

11. The control device according to claim 9, wherein the receiving module is configured to receive a frequency allocation message of each station by using the dedicated channel, wherein the frequency allocation message of each station carries a node identifier and received signal strength information for a frequency of each station, and wherein the received signal strength information on the frequency of each station comprises interference signal strength; and wherein the instructions to determine the station needing frequency allocation include instructions to:
determine, when the interference signal strength is greater than a preset threshold, that a station whose interference signal strength is greater than the preset threshold is the station needing frequency allocation.

12. The control device according to claim 9, wherein the node information of each station comprises the node identifier, and wherein the node identifier is identifies the station.

13. The control device according to claim 12, wherein the node information of each station further comprises a node location, transmit power, receiver sensitivity, and an antenna gain.

14. The control device according to claim 9, wherein the optimum working frequency comprises the optimum transmit working frequency and the optimum receive working frequency, and wherein the instructions to compute the optimum working frequency of the station needing frequency allocation include instructions to:

compute the optimum transmit working frequency of the node i, wherein the optimum transmit working frequency satisfies at least the following conditions: $P_{i \to j} > RS_j$ and $MIN\{RS_x/P_{i \to x}\} > CI_x$; and compute the optimum receive working frequency of the node i, wherein the optimum receive working frequency satisfies at least the following conditions: $P_{j \to i} > RS_i$ and $MIN\{RS_i/P_{y \to i}\} > CI_i$;

wherein $P_{i \to j}$ represents the received signal strength generated by the node i for the node j when the node i works at the transmit working frequency, wherein $P_{j \to i}$ represents the received signal strength generated by the node j for the node i when the node i works at a receive working frequency;

wherein $RS_x$ represents the receiver sensitivity existing when a node x works in the state of maximum channel bandwidth and the highest modulation mode, wherein $P_{i \to x}$ represents interference signal strength generated by the node i for the node x when the node i works at the transmit working frequency, wherein $RS_x/P_{i \to x}$ represents the carrier-to-interference ratio of the node x, wherein $CI_x$ represents the carrier-to-interference ratio threshold for the node x, and wherein a receive working frequency of the node x is a transmit working frequency selected by the node i or an adjacent frequency of a transmit working frequency selected by the node i; and wherein $RS_i$ represents the receiver sensitivity existing when the node i works in the state of the maximum channel bandwidth and the highest modulation mode, wherein $P_{y \to i}$ represents interference signal strength generated by a node y for the node i when the node i works at the receive working frequency, wherein $RS_i/P_{y \to i}$ represents the carrier-to-interference ratio of the node i, wherein $CI_i$ represents a carrier-to-interference ratio threshold for the node i, the node y is any node or at least one node other than the node i and the node j, and wherein a transmit working frequency of the node y is a receive working frequency selected by the node i or an adjacent frequency of a receive working frequency selected by the node i.

15. The control device according to claim 9, wherein the program further includes instructions to:
disconnect the dedicated channel, and establish, using the optimum working frequency, a connection to the station needing frequency allocation.

16. The control device according to claim 9, wherein the dedicated channel comprises a virtual local area network VLAN connection, a label switched path LSP connection, or a physical link connection.

17. A system in a microwave network, wherein the system comprises:
a control device; and
at least one station configured to send a frequency allocation message by using a dedicated channel, wherein the frequency allocation message carries a node identifier and received signal strength information for a frequency;
wherein the control device is configured to determine, according to the frequency allocation message, a station needing frequency allocation, and to obtain node information of each station in the network, wherein the node information of each station in the network comprises first node information of a first station other than a station having the control device and other than a station identified by the node identifier, and wherein the first node information comprises an antenna direction of the first station, and wherein the control device is further configured to compute, according to the received signal strength information for the frequency of the station needing frequency allocation and the node information of each station and further according to the antenna direction of the first station, an optimum working frequency of the station needing frequency allocation, and to allocate the optimum working frequency to the station needing frequency allocation wherein the station needing frequency allocation is a node i, wherein a station directly connected to the station needing frequency allocation is a node j, and wherein the control device being configured to compute the optimum working frequency of the station needing frequency allocation comprises the control device being configured to:

compute an optimum transmit working frequency of the node i, wherein the optimum transmit working frequency satisfies conditions associated with a received signal strength generated by the node i for the node j when the node i works at a transmit working frequency, a receiver sensitivity existing when a third node works in a state of maximum channel bandwidth and a highest modulation mode, a carrier-to-interference ratio of the third node, wherein the third node is at least one node other than the node i and the node j; and compute an optimum receive working frequency of the node i, wherein the optimum receive working frequency satisfies conditions associated with a received signal strength generated by the node j for the node i when the node i works at a receive working frequency, a receiver sensitivity existing when the node i works in the state of the maximum channel bandwidth and the highest modulation mode, a carrier-to-interference ratio of the node i, a carrier-to-interference ratio threshold for the node i.

18. The system according to claim 17, wherein the control device is configured to receive, by using the dedicated channel, the frequency allocation message of the station needing frequency allocation, wherein the frequency allocation message is a frequency allocation request message, and wherein the control device is further configured to determine, according to a node identifier carried in the frequency allocation request message, that a station which sends the frequency allocation request message is the station needing frequency allocation.

19. The system according to claim 17, wherein the control device is configured to receive a frequency allocation message of each station by using the dedicated channel, wherein the frequency allocation message of each station carries a node identifier and received signal strength information for a frequency of each station, and the received signal strength information on the frequency of each station comprises interference signal strength, and wherein the control device is further configured to, when the interference signal strength is greater than a preset threshold, determine that a station whose interference signal strength is greater than the preset threshold is the station needing frequency allocation.

* * * * *

UNITED STATES PATENT AND TRADEMARK OFFICE
CERTIFICATE OF CORRECTION

PATENT NO. : 10,952,213 B2  
APPLICATION NO. : 15/686440  
DATED : March 16, 2021  
INVENTOR(S) : Long et al.

Page 1 of 1

It is certified that error appears in the above-identified patent and that said Letters Patent is hereby corrected as shown below:

In the Claims

In Column 21, Line 54, Claim 6, delete "$P_{j \to i} > RS_x$" and insert --$P_{i \to j} > RS_x$--.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*